(No Model.)

M. THURSTON.
HEAT SCREEN.

No. 432,340. Patented July 15, 1890.

Witnesses
E. H. Fry
H. D. Durfee

Inventor
Maurice Thurston,
Per C. A. Shawler
Attorneys.

UNITED STATES PATENT OFFICE.

MAURICE THURSTON, OF WORCESTER, MASSACHUSETTS.

HEAT-SCREEN.

SPECIFICATION forming part of Letters Patent No. 432,340, dated July 15, 1890.

Application filed April 8, 1890. Serial No. 347,044. (No model.)

*To all whom it may concern:*

Be it known that I, MAURICE THURSTON, of Worcester, in the county of Worcester, State of Massachusetts, have invented certain new and useful Improvements in Heat-Screens, of which the following is a description sufficiently full, clear, and exact to enable any person skilled in the art or science to which said invention appertains to make and use the same, reference being had to the accompanying drawings, forming part of this specification, in which—

Figure 1:
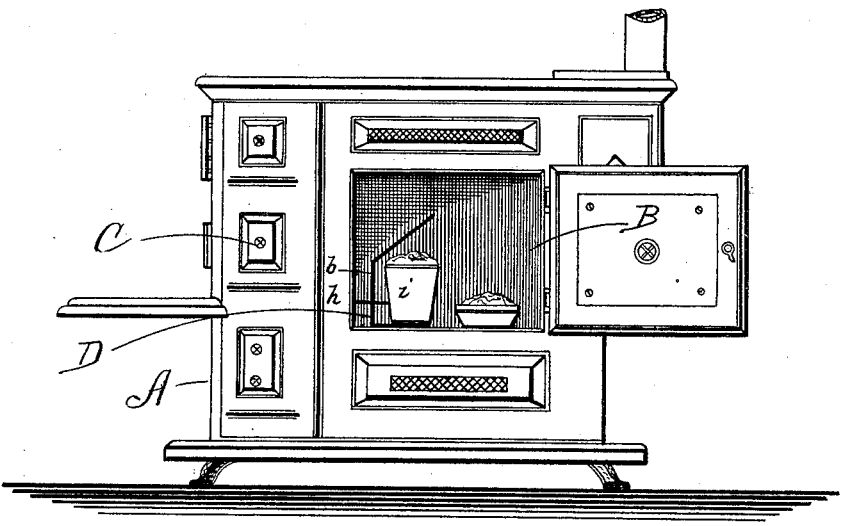
Figures 2, 3:
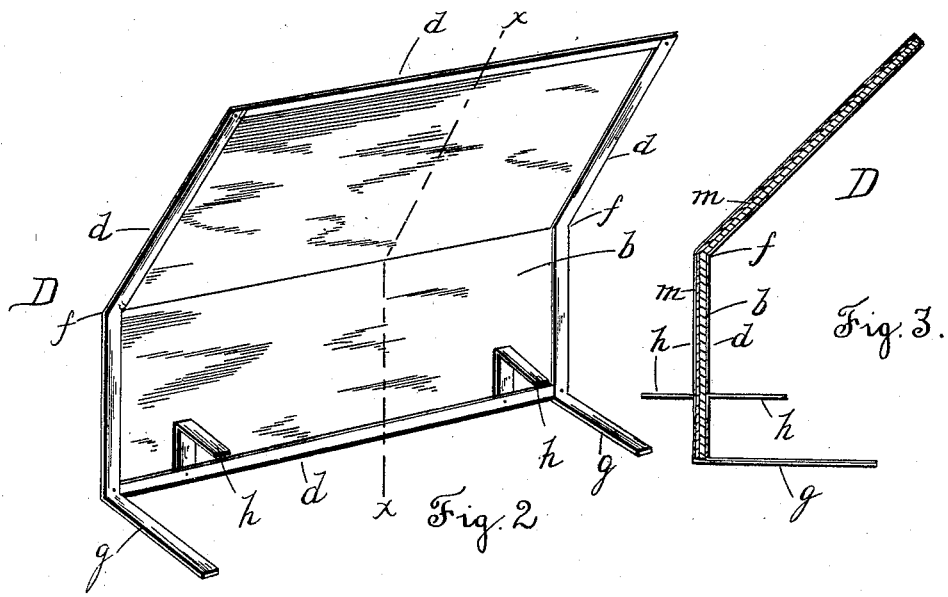

Figure 1 is a side elevation of a stove, showing my improved screen in position in the oven; Fig. 2, a perspective view, enlarged, of the screen; and Fig. 3, a vertical transverse section taken on line $x\,x$ in Fig. 2.

Like letters of reference indicate corresponding parts in the different figures of the drawings.

My invention relates especially to screens for protecting cooking food while in the oven from the direct action of the heat from the fire-box; and it consists in certain novel features hereinafter fully set forth and claimed, the object being to produce a simpler, cheaper, and more effective device of this character than is now in ordinary use.

The nature and operation of the improvement will be readily understood by all conversant with such matters from the following explanation.

It is well known that in baking pastry or similar articles of food provided with a crust the crust or outer surface is frequently burned or charred before the body of the article is baked, it being necessary to employ an intense heat in the ovens to thoroughly cook said articles. This burning or charring is caused by the direct radiation of the heat from the fire-box against the cooking food. To overcome this it is frequently customary to dispose a layer of oiled paper or similar material over the article to lessen the direct action of the heat. A disagreeable odor or taste is thus imparted to the food, rendering the use of this expedient undesirable.

In the drawings, A represents the stove, B the oven, C the fire-box, and D the screen, considered as a whole.

The screen consists of a sheet or plate $b$, composed, preferably, of asbestus cloth or similar non-heat-conducting material. This sheet is bound at its edges with a metallic band $d$, which may be readily bent, as shown at $f$. The bands $d$ at the side of said sheet are extended and bent outward at right angles, forming legs or rests $g$ for supporting the screen.

Metallic arms $h$ are secured to the bottom band $d$ and project horizontally outward at right angles to the plate $b$, said arms being adapted to engage the wall of the oven or the utensil $i$ containing the cooking food, as shown in Fig. 1.

To stiffen the asbestus plate $b$, I sometimes use a backing comprising a thin sheet or plate of zinc $m$, said plate being sufficiently pliable to allow the screen to be bent at any desired angle.

In use the screen is disposed upon its legs $g$ within the oven B between the inner wall of the fire-box C and the article $i$ being cooked, the guards or fenders $h$ preferably being in engagement with said fire-box.

The body of the screen may be readily bent at any desired angle above the crust or exposed portion of the cooking food, and said screen being formed of non-heat-conducting material, as described, protects the same from the direct rays of the heat from said fire-box without interfering with the proper cooking of the food by the action of the steady heat in the oven.

Having thus explained my invention, what I claim is—

1. A heat-screen comprising a sheet of asbestus paper, a backing of zinc or similar metallic non-heat-conducting material, a metallic binding securing said sheets together, the side pieces of said binding being extended to form supporting-arms for the screen, substantially as set forth.

2. The screen D, comprising the asbestus sheet B, the binding-strip $d$, bent to form supporting-arms $g$, and the guards or fenders $h$, secured to one of said strips, substantially as and for the purpose set forth.

MAURICE THURSTON.

Witnesses:
ADAM TOLMAN,
CHARLES S. DODGE,
MARVIN M. TAYLOR.